United States Patent
Honda

(10) Patent No.: US 6,978,628 B2
(45) Date of Patent: Dec. 27, 2005

(54) AIR CONDITIONING DEVICE FOR VEHICLE

(75) Inventor: Keita Honda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/744,651

(22) Filed: Dec. 23, 2003

(65) Prior Publication Data

US 2004/0134204 A1    Jul. 15, 2004

(30) Foreign Application Priority Data

Dec. 26, 2002 (JP) ............................... 2002-376325
Dec. 26, 2002 (JP) ............................... 2002-376515

(51) Int. Cl.[7] .......................... B60H 1/32; F25D 17/04; F25D 23/12; F25B 49/00
(52) U.S. Cl. ...................... 62/134; 62/186; 62/228.4; 62/230; 62/244; 62/259.2
(58) Field of Search ................... 62/134, 228.1, 62/228.4, 230, 244, 259.2, 186

(56) References Cited

U.S. PATENT DOCUMENTS

| | | |
|---|---|---|
| 6,450,275 B1 | 9/2002 | Gabriel et al. |
| 2002/0073726 A1 | 6/2002 | Hasebe et al. |
| 2004/0206102 A1 * | 10/2004 | Homan et al. ............. 62/228.1 |
| 2005/0005620 A1 * | 1/2005 | Oda et al. ...................... 62/183 |

FOREIGN PATENT DOCUMENTS

| | | | | |
|---|---|---|---|---|
| JP | 01223017 A | * | 9/1989 | ............ B60H 1/32 |
| JP | 2002-187435 | | 7/2002 | |
| JP | 2002-223505 | | 8/2002 | |

* cited by examiner

Primary Examiner—Marc Norman
(74) Attorney, Agent, or Firm—Harness, Dickey & Pierce, PLC

(57) ABSTRACT

When a preset protection temperature is exceeded, an air conditioning device for a vehicle equipped with air conditioner inverter protection means works to lower the output of the air conditioner inverter. This lowers the output of the air conditioner inverter, whereby heat is released in decreased amounts from the coolant through a first heat exchanger suppressing a rise in the temperature of the EV cooling water.

14 Claims, 6 Drawing Sheets

Fig.7

TEMP. OF EV RADIATOR COOLING WATER

| ZONE A | ZONE B | ZONE C | ZONE D | ZONE E |
|--------|--------|--------|--------|--------|
| 55°C | 60°C | 65°C | 70°C | |

AIR CONDITIONING DEVICE FOR VEHICLE

BACKGROUND OF THE INVENTION

1. Field of the Invention

The present invention relates to air conditioner control means for controlling the refrigerating ability in the refrigeration cycle of an air conditioning device in a vehicle that has a travel use motor. More particularly, the invention relates to air conditioner control means for limiting the refrigerating ability in the refrigeration cycle to maintain, above a predetermined level, the air-cooling ability of a radiator for air-cooling the cooling water that cools electric parts, related to a travel use motor, such as a travel use motor inverter mounted on the vehicle.

2. Description of the Related Art

In a refrigeration cycle of a vehicle having a travel use motor, such as a hybrid car having a travel use engine as well as a travel use motor, it is a general practice to arrange a first heat exchanger (condenser) that removes, by being air-cooled, the heat which the coolant has absorbed from the air introduced into the vehicle compartment, and a radiator (hereinafter referred to as EV radiator) that air-cools the cooling water to cool various electric parts mounted on the hybrid car in series with a radiator (hereinafter referred to as the engine radiator) that air-cools the cooling water for cooling the travel use engine, in the direction in which the cooling air flows. There has further been proposed a refrigeration cycle for controlling the rotational speed of an air-cooling fan depending upon the temperature of the electric parts to maintain the cooling water temperature below a predetermined value to prevent a decrease in ability, caused by an increase in the temperature, of the electric parts.

From the standpoint of saving space in modern hybrid cars, it has been attempted to fabricate the EV radiator and the engine radiator integrally together as an integrated radiator, and to arrange the first heat exchanger and the integrated radiator in series in the direction in which the cooling air flows, instead of arranging the three units, i.e., the first heat exchanger, the EV radiator and the engine radiator in series in the direction in which the cooling air flows.

Here, the temperature of the cooling water (hereinafter referred to as engine cooling water) for cooling the engine is permitted to rise up to 110° C., and can be sufficiently cooled even with the air that has received heat from the coolant through the first heat exchanger. However, the temperature of the cooling water (hereinafter referred to as EV cooling water) for cooling the electric parts is permitted to rise up to only 65° C. to protect the electric parts. It is, therefore, probable that the cooling water cannot be air-cooled down to 65° C. by the air that has received heat radiated from the coolant through the first heat exchanger.

SUMMARY OF THE INVENTION

It is an object of the present invention to provide an air conditioning device for a vehicle equipped with a refrigeration cycle, for air-cooling a coolant through a first heat exchanger and with an EV radiator, that is capable of limiting the cooling ability of the refrigeration cycle to maintain the temperature of the EV cooling water to be not higher than 65° C.

In order to accomplish the above object, according to a first aspect of the present invention, there is provided an air conditioning device for a vehicle comprising: a refrigeration cycle having a compressor for compressing and blowing out a coolant and a first heat exchanger for air-cooling the coolant blown out from the compressor that are mounted on a vehicle having a travel use motor; an air conditioner inverter for controlling the rotational speed of the compressor by feeding electric power to said compressor; electric parts related to the travel use motor and for producing electric power in relation to the travel use motor; a radiator arranged downstream of the first heat exchanger in series in a direction in which the cooling air flows for air-cooling the cooling water that cools said air conditioner inverter and said electric parts related to the travel use motor; cooling water temperature detector means for detecting the temperature of said cooling water that flows out from said radiator; and air conditioner inverter protection means for lowering the output of said air conditioner inverter when the temperature of the cooling water detected by said cooling water temperature detector means exceeds a preset protection temperature.

When the temperature of the EV cooling water detected by cooling water temperature detector means starts to rise, the protection temperature may be exceeded. In this case, the output of the air conditioner inverter is lowered, whereby the rotational speed of the compressor decreases and the coolant is circulated in a decreased amount. Therefore, heat is radiated in decreased amount from the coolant through the first heat exchanger, and the temperature of the cooling air decreases making it possible to sufficiently air-cool the EV cooling water through the EV radiator. As a result, an increase in the temperature of the EV cooling water is suppressed, and the electric parts related to the travel use motor are protected.

According to a second aspect of the present invention, there is provided an air conditioning device, for a vehicle, wherein said electric parts related to the travel use motor include a travel use motor inverter that controls the rotational speed of said travel use motor by feeding electric power to said travel use motor.

This prevents damage caused by an increase in the temperature of the travel use motor inverter, and prevents the vehicle from coming into a halt that results from the stopping of the travel use motor.

According to a third aspect of the present invention, there is provided an air conditioning device, for a vehicle, wherein said electric parts related to the travel use motor includes a DCDC converter that lowers the DC power of a main battery mounted on said vehicle and feeds the lowered power to an auxiliary battery.

This further prevents the damage caused by an increase in the temperature of the DCDC converter, and prevents the halting of various auxiliary devices caused by a lack of electric charging of the auxiliary battery.

According to a fourth aspect of the present invention, there is provided an air conditioning device for a vehicle, further comprising the second heat exchanger arranged in a duct that introduces the air into the compartment to cool the air by the coolant, wherein said air conditioning control means decreases the amount of heat absorbed by the coolant through said second heat exchanger when the temperature of the cooling water detected by said cooling water temperature detector means is higher than a setpoint value.

When the temperature of the EV cooling water detected by the cooling water temperature detector means is higher than a setpoint value (e.g., 65° C.), the coolant in the second heat exchanger adsorbs heat in decreased amounts and, accordingly, heat is released in decreased amounts to the cooling air from the coolant through the first heat exchanger. Therefore, there is obtained the effect same as that of the first aspect.

According to a fifth aspect of the present invention, there is provided an air conditioning device for a vehicle, further comprising an internal/external air change-over door that changes over to either an external air introduction mode for introducing the air into said duct from outside the compartment or an internal circulation mode for circulating the air in the compartment, wherein said air conditioning control means is an internal/external air change-over control means for changing said internal/external air change-over door over to the internal air circulation mode when the temperature of the cooling water detected by said cooling water temperature detector means is higher than the setpoint value.

When the temperature of the EV cooling water detected by the cooling water temperature detector means is higher than a setpoint value (e.g., 65° C.), therefore, the air (internal air) that is once cooled in the vehicle compartment is introduced into the second heat exchanger, whereby the coolant in the second heat exchanger adsorbs heat in decreased amounts and, accordingly, heat is released in decreased amounts to the cooling air from the coolant through the first heat exchanger. Therefore, there is obtained the effect same as that of the first aspect.

According to a sixth aspect of the present invention, there is provided an air conditioning device for a vehicle, wherein said air conditioning control means lowers the amount of heat released from the coolant through said first heat exchanger when the temperature of the cooling water detected by said cooling water temperature detector means is higher than a setpoint value.

When the temperature of the EV cooling water detected by the cooling water temperature detector means is higher than a setpoint value (e.g., 65° C.), heat is released in decreased amounts to the cooling air from the coolant through the first heat exchanger. Therefore, there is obtained the effect same as that of the first aspect.

According to a seventh aspect of the present invention, there is provided an air conditioning device for a vehicle, further comprising a compressor for compressing and blowing the coolant into said first heat exchanger, wherein said air conditioning control means is compressor control means for controlling the blowing amount of said compressor when the temperature of the cooling water detected by said cooling water temperature detector means is higher than the setpoint value.

Therefore, when the temperature of the EV cooling water detected by the cooling water temperature detector means is higher than the setpoint value (e.g., 65° C.), the coolant is blown in limited amounts into the first heat exchanger, and heat is released in decreased amounts into the cooling air from the coolant through the first heat exchanger. Therefore, there is obtained the effect same as that of the first aspect.

According to an eighth aspect of the present invention, there is provided an air conditioning device for a vehicle, wherein, when the temperature of the cooling water detected by said cooling water temperature detecting means is higher than the setpoint value, said compressor control means comprises a combination of one or two or more first compressor control means for inhibiting the rise of rotational speed of said compressor, second compressor control means for lowering the rotational speed of said compressor by a predetermined amount, and third compressor control means for halting said compressor.

Therefore, if there are set a plurality of setpoint values stepwise for the temperatures of the EV cooling water detected by the cooling water temperature detector means, the amount of the coolant blown into the first heat exchanger is limited depending upon the steps and decreases stepwise the amount of heat released into the cooling air from the coolant through the first heat exchanger. This makes it possible to stepwisely lower the temperature of the cooling air for cooling the EV cooling water and, hence, to carry out the control operation depending upon the degree of emergency.

According to a ninth aspect of the present invention, there is provided an air conditioning device for a vehicle, further comprising the second heat exchanger arranged in a duct that introduces the air into the compartment to cool the air by the coolant, an internal/external air change-over door that changes over to either an external air introduction mode for introducing the air into said duct from outside the compartment or an internal circulation mode for circulating the air in the compartment, and a compressor for compressing and blowing the coolant into said first heat exchanger, wherein, when the temperature of the cooling water detected by said cooling water temperature detecting means is higher than the setpoint value, said conditioning air control means comprises internal/external air change-over control means for changing said internal/external air change-over door over to the internal air circulation mode, and any combination of two or more of first compressor control means for inhibiting the rise of rotational speed of said compressor, second compressor control means for lowering the rotational speed of said compressor by a predetermined amount, and third compressor control means for halting said compressor.

Therefore, if there are set a plurality of setpoint values, stepwise, for the temperatures of the EV cooling water detected by the cooling water temperature detector means, the amount of the coolant blown into the first heat exchanger or the amount of heat absorbed by the coolant through the second heat exchanger is decreased depending upon the steps, decreasing stepwise the amount of heat released into the cooling air from the coolant through the first heat exchanger. Therefore, there is obtained the effect same as that of the eighth aspect.

The present invention may be more fully understood from the description of preferred embodiments of the invention set forth below, together with the accompanying drawings.

BRIEF DESCRIPTION OF THE DRAWING

FIG. 7 is a schematic diagram illustrating sectionalizing the temperature region according to the control method of the fourth embodiment.

DESCRIPTION OF THE PREFERRED EMBODIMENTS

Figure 1:
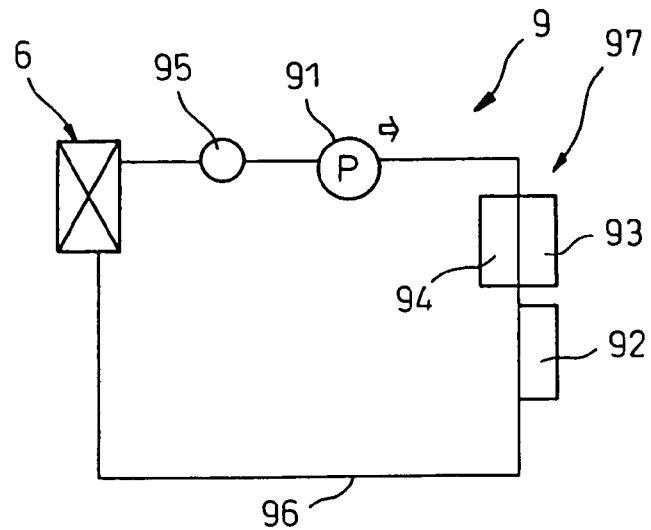
FIG. 1 is a diagram illustrating the constitution of an EV cooling water circuit according to a first embodiment.

The constitution according to a first embodiment of the invention will be described with reference to FIGS. 1 and 2. Referring to FIG. 2, an air conditioning device 2 for vehicle according to the first embodiment is arranged in the foremost part of a compartment 15 of a hybrid car 1 that has a travel use engine 81 and a travel use motor (not shown). The air conditioning device 2 for vehicle includes an air conditioning unit 5 for air-conditioning the air (hereinafter called conditioning air) blown into the compartment 15, a refrigeration cycle 3 which circulates the coolant into the air conditioning unit 5 to cool the conditioning air to absorb the heat and to release the heat into the atmosphere (traveling air) introduced as the cooling air that will be described later, as well as a known central processing unit (CPU), a ROM, a standby RAM, and an air conditioner control unit (hereinafter called ECU) for executing the operation processing according to a control program stored in the ROM in response to various input signals (none of the CPU, the ROM, the standby RAM or the air conditioner control unit are illustrated here).

The air conditioning unit 5 is provided with a duct 51 which forms an air path for introducing the conditioning air into the compartment 15. In the most upstream portion of the duct 51, there is provided an internal/external air changeover door 52 which is driven by an internal/external air change-over actuator (not shown) such as a servo motor that is controlled by the air conditioner control unit (ECU) to change over to either an external air introduction mode for introducing the conditioning air from outside the compartment or the internal air circulation mode for circulating the air in the compartment 15.

On the downstream of the internal/external air change-over door 52, there is provided a blower 53 which introduces the air from the compartment (internal air) or the air from the outside of the compartment (external air) through the internal/external air change-over door 52, and blows the air as the conditioning air into the duct 51.

On the downstream of the blower 53, there is provided, over the whole surface of the duct 51, a second heat exchanger (evaporator) 33 that constitutes a portion of the refrigeration cycle 3 and effects the cooling by absorbing heat from the conditioning air. On the downstream of the second heat exchanger 33, there is provided a third heat exchanger (heater core) 54 that constitutes a portion of an engine cooling water circuit 8 that will be described later and heats, with the engine cooling water, the conditioning air that is cooled through the second heat exchanger 33. The third heat exchanger 54 is provided with an air-mixing door 55 for adjusting the ratio of the flow rate of the conditioning air by-passing the third heat exchanger 54 and the flow rate of the conditioning air passing through the third heat exchanger 54 by opening the door depending upon a target temperature of the conditioning air blown into the compartment 15.

On the downstream of the third heat exchanger 54 and the air-mixing door 55, there are provided blow paths for introducing the conditioning air into the compartment 15, i.e., a face blow path 56 for introducing the conditioning air to face blow ports (not shown) for chiefly blowing the cold air to the heads and chests of the passengers from the front part of the compartment 15, a foot blow path 57 for introducing the conditioning air to foot blow ports (not shown) for chiefly blowing the warm air to the feet of the passengers, and a defroster blow path 58 for introducing the conditioning air to defroster blow ports (not shown) for chiefly blowing the warm air to the windshield.

The refrigeration cycle 3 includes a compressor 31 that compresses the gaseous coolant that is vaporized upon absorbing the heat from the conditioning air through the second heat exchanger 33 and blows the coolant in a state (i.e., high temperature and high pressure) in which it can be easily liquefied, a first heat exchanger (condenser) 4 that liquefies the gaseous coolant of high a temperature and a high pressure, blown out from the compressor 31, by the cooling air that will be described later to form the liquid coolant as a result of releasing the heat, a coolant expansion valve 32 for rapidly expanding the liquid coolant of a high pressure so as to be injected as the coolant of the form of a low-temperature mist, and the second heat exchanger 33 for absorbing heat from the conditioning air as heat of vaporization of the coolant to cool the air. The refrigeration cycle 3 is connected through coolant pipes 34 so that the coolant flows in order of the compressor 31, first heat exchanger 4, coolant expansion valve 32 and second heat exchanger 33.

The first heat exchanger 4 is arranged at the foremost part in the engine room of the hybrid car 1. A front grill 12 is provided in front of the first heat exchanger 4 on the upper side of a front bumper but on the lower side of the front end of a hood 14 to introduce the traveling air as the cooling air. On the downstream of the first heat exchanger 4 in the direction in which the cooling air flows, there are arranged an engine radiator 84 for air-cooling the engine cooling water that is for cooling the travel use engine 81, and an integrated radiator 7 that is arranged in parallel with the engine radiator 84 on the lower side of the engine radiator 84 in the up-and-down direction and that includes an EV radiator 6 for air-cooling the EV cooling water that is for cooling various electric parts mounted on the hybrid car 1. Downstream of the integrated radiator 7, in a direction in which the cooling air flows, there is arranged an air-cooling fan 35 in series with the first heat exchanger 4 and the integrated radiator 7 to introduce the traveling air as the cooling air into the engine room 11 through the front grill 12.

The engine radiator 84 constitutes an engine cooling water circuit 8 together with the travel use engine 81, third heat exchanger 54 provided in the air conditioning unit 5 to heat the conditioning air and an engine cooling water pump 82 that imparts the power for circulating the engine cooling water. The engine radiator 84 is connected through engine cooling water pipes 83 so that the engine cooling water flows in order of the engine cooling water pump 82, travel use engine 81, third heat exchanger 54, travel use engine 81 and engine radiator 84.

Figure 2:
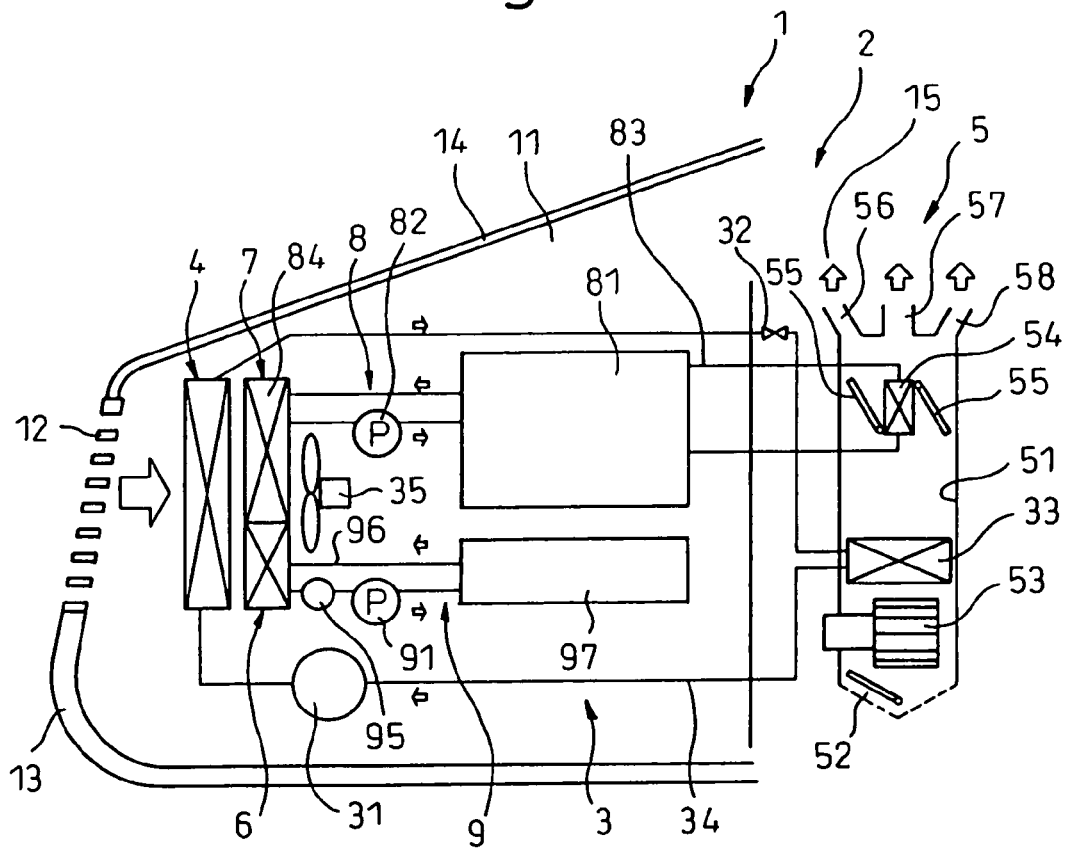
FIG. 2 is a diagram illustrating the whole constitution of an air conditioning device for vehicles according to the first embodiment.

Referring to FIG. 1, the EV radiator 6 constitutes an EV cooling water circuit 9 together with a group 97 of electric parts and an EV cooling water pump 91 that imparts the power for circulating the EV cooling water.

The group 97 of electric parts include a travel use motor inverter 92 which converts a DC power of a car-mounted main battery (not shown) into a predetermined three-phase AC power and further converts the three-phase AC power and feeds the power to the travel use motor in response to an instruction from an engine control unit (not shown) to control the rotational speed of the travel use motor, a DCDC converter which lowers the DC power of the car-mounted main battery down to a predetermined DC power and feeds it to an auxiliary battery (not shown) for operating auxiliary devices mounted on the hybrid car 1 to electrically charge the auxiliary battery, and an air conditioner converter 94 which converts the DC power of the auxiliary battery into a predetermined three-phase AC power, feeds the three-phase AC power to a drive motor (not shown) of the compressor 31 in response to an instruction from an air conditioner control unit (ECU) to control the rotational speed of the compressor 31.

The EV cooling water pump 91, DCDC converter 93, air conditioner inverter 94, travel use motor inverter 92 and EV radiator 6 are connected together through EV cooling water pipes 96, so that the EV cooling water flows in this order. On the EV cooling water outlet side of the EV radiator 6, there is provided a water temperature sensor 95 as means for detecting the temperature of the EV cooling water that flows out from the EV radiator 6, and the detected value is input to the engine control unit and to the air conditioner control unit.

The engine control unit stores a protection temperature (first protection temperature)(65° C. in this embodiment) in advance to prevent the travel use motor inverter 92 from being damaged by a rise in the temperature. The engine control unit further contains a control program as means for protecting the electric parts related to the travel use motor to instruct the interruption of output from the travel use motor inverter 92 to the travel use motor in case the input value from the water temperature sensor 95 exceeds the first protection temperature. Concerning the DCDC converter 93, too, the engine control unit stores a similar protection temperature (first protection temperature)(similarly, 65° C.), and contains a control program as means for protecting the electric parts related to the travel use motor to instruct the interruption of output from the DCDC converter 93 to the auxiliary battery in case the input value from the water temperature sensor 95 exceeds the first protection temperature.

The air conditioner control unit stores a protection temperature (second protection temperature) lower than the first protection temperature, in advance, to prevent the air conditioner inverter 94 from being damaged by a rise in the temperature. The air conditioner control unit further contains a control program as means for protecting the air conditioner inverter to instruct the interruption of output from the air conditioner inverter 94 to the compressor 31 in case the input value from the water temperature sensor 95 exceeds the second protection temperature.

Next, described below is the operation of the first embodiment. In the air conditioning unit 5, the conditioning air, introduced into the duct 51 by the blower 53 through the internal/external air change-over door 52, all passes through the second heat exchanger 33 and is cooled as the heat is robbed as the heat of vaporization of the coolant. The conditioning air after cooled partly passes through the air-mixing door 55 and through third heat exchanger 54, and is heated by the engine cooling water. The opening degree of the air-mixing door 55 is determined depending upon a target temperature of the conditioning air blown into the compartment 15. The conditioning air heated through the third heat exchanger 54 is mixed with the conditioning air that has by-passed the third heat exchanger 54, and is blown into the compartment through the face blow path 56, foot blow path 57 or defroster blow path 58.

In the refrigeration cycle 3, the gaseous coolant of a high temperature and a high pressure blown out from the compressor 31 is liquefied to become a liquid coolant in the first heat exchanger 4 as it gives the heat to the cooling air introduced by the air-cooling fan 35 through the front grill 12. The liquid coolant is injected through the coolant expansion valve 32 to expand like a mist, and flows into the second heat exchanger 33 where it is vaporized and robs the conditioning air of heat. Thereafter, the coolant is compressed again by the compressor 31 to assume a high temperature and a high pressure to repeat the cycle.

In the engine cooling water circuit 8, the engine cooling water blown out by the engine cooling water pump 82 is sent to the travel use engine 81 to cool the travel use engine 81. Thereafter, the engine cooling water is sent to the third heat exchanger 54 to heat the conditioning air and is, then, sent to the engine radiator 84 where it is air-cooled by the cooling air that has passed through the first heat exchanger 4 and is blown out again by the engine cooling water pump 82.

In the EV cooling water circuit 9, the EV cooling water blown out from the EV cooling water pump 91 is sent to the group 97 of electric parts (travel use motor inverter 92, DCDC converter 93, air conditioner inverter 94) to cool them. Thereafter, the EV cooling water is air-cooled in the EV radiator 6 by the cooling air that has passed through the first heat exchanger 4, and is blown out again by the EV cooling water pump 91.

The water temperature sensor 95 detects the temperature of the EV cooling water that flows out from the EV radiator 6, and a detected value is input to the air conditioner control unit and to the engine control unit. When the input value of the water temperature sensor 95 exceeds the first protection temperature, the output from the travel use motor inverter 92 to the travel use motor is interrupted, or the output from the DCDC converter 93 to the auxiliary battery is interrupted in response to an instruction from the engine control unit. When the input value from the water temperature sensor 95 exceeds the second protection temperature, further, the output from the air conditioner inverter 94 to the compressor 31 is interrupted in response to an instruction from the air conditioner control unit.

Figure 3:
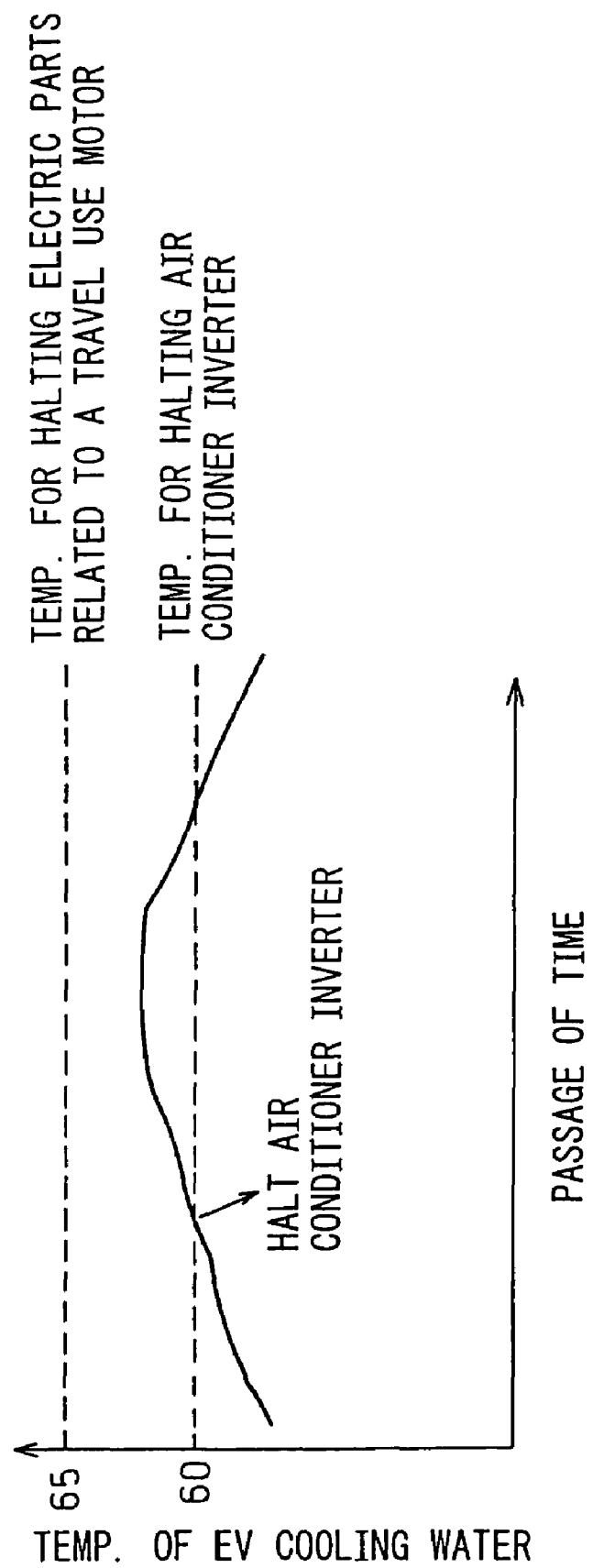
FIG. 3 is a graph illustrating changes in a first protection temperature, in a second protection temperature and in an EV cooling water temperature according to the first embodiment.

The second protection temperature is lower than the first protection temperature and, hence, the output from the air conditioner inverter 94 is interrupted, first. Therefore, when the temperature of the EV cooling water rises in excess of 60° C. as shown in FIG. 3, the compressor 31, first, ceases to rotate, whereby the coolant stops circulating, heat is released in decreased amounts from the coolant through the first heat exchanger 4, and the temperature of the cooling air drops. As a result, the EV cooling water is air-cooled to a sufficient degree through the EV radiator 6, and the temperature of the EV cooling water drops.

Described next is the effect of the first embodiment. As described above, there is employed an air conditioning device for a vehicle comprising the refrigeration cycle 3 having the compressor 31 for compressing and blowing out the coolant and the first heat exchanger 4 for air-cooling the medium, that are mounted on the hybrid car 1 having a travel use motor, the air conditioner inverter 94 for controlling the rotational speed of the compressor 31, electric parts (e.g., travel use motor inverter 92, DCDC converter 93, etc.) related to the travel use motor for producing an electric power in relation to the travel use motor, the EV radiator 6 arranged downstream of the first heat exchanger 4 in series in a direction in which the cooling air flows to air-cool the EV cooling water that cools the air conditioner inverter 94 and the electric parts related to the travel use motor, the water temperature sensor 95 for detecting the temperature of the EV cooling water that flows out from the EV radiator 6, means for protecting the electric parts related to the travel use motor to lower the outputs of the electric parts related to the travel use motor when the temperature of the EV cooling water detected by the water temperature sensor 95 exceeds a preset first protection temperature, and air conditioner inverter protection means for lowering the output of the air conditioner inverter 94 when the temperature of the EV cooling water detected by the water temperature sensor 95 exceeds a second protection temperature which has been set in advance to be lower than the first protection temperature.

Therefore, when the temperature of the EV cooling water detected by the water temperature sensor 95 starts to rise, the temperature of the EV cooling water exceeds the second protection temperature, first, whereby the output of the air conditioner inverter 94 is interrupted, first, the compressor 31 ceases to rotate, and the coolant stops circulating. Therefore, heat is released in decreased amounts from the coolant through the first heat exchanger 4, the temperature of the cooling air drops, and the EV cooling water is air-cooled through the EV radiator 6 to a sufficient degree. As a result, is rise in the temperature of the EV cooling water is suppressed, and electric parts related to the travel use motor are protected.

Next, described below is another embodiment. In this embodiment, the invention is applied to the hybrid car 1 having the travel use motor and the travel use engine 81. The invention, however, may be applied to a railway vehicle or an electric car that travels using the travel use motor only.

Means for protecting the electric parts related to the travel use motor and means for protecting the air conditioner inverter were so constituted as to interrupt the output, i.e., to open the switch in the output circuit in response to an instruction by the control program incorporated in the engine control unit and in the air conditioner control unit. However, the constitution may be such that the output circuit is provided with a fuse so that in case the first protection or the second protection temperature is exceeded, the fuse is cut to break the circuit.

In this embodiment, the output of the travel use motor inverter 92 and the output of the DCDC converter 93 are interrupted as means for protecting the electric parts related to the travel use motor. However, the output may be limited to be smaller than a predetermined value or may be decreased by a predetermined amount. Concerning means for protecting the air conditioner inverter, too, the output of the air conditioner inverter 94 may be limited to be smaller than a predetermined value to limit the rotational speed of the compressor 31 to be smaller than a predetermined value, or the output may be decreased by a predetermined amount to decrease the rotational speed of the compressor 31 by a predetermined amount. Concerning means for protecting the air conditioner inverter, further, the internal/external air change-over door 52 may be changed over and fixed in the internal air-circulation mode irrespective of the output of the air conditioner inverter 94, or may further be a combination of two or more of four means which are changing over to the internal air circulation mode in a fixed manner, halt the rotation of the compressor 31, decrease the rotational speed by a predetermined amount and limit the rotational speed to be lower than a predetermined value.

As a method of returning the air conditioning operation to the normal control operation after the temperature of the EV cooling water is recovered to be lower than the second protection temperature (60° C.) by the air conditioner inverter protection means, there may be employed a hysteresis system which permits the operation to return to the normal control operation only when the temperature of the EV cooling water has dropped down to a temperature (e.g., 57° C.) which is lower than 60° C.

In this embodiment, the first heat exchanger 4 is disposed being faced to the whole front surface of the integrated radiator 7. Further, a portion of the first heat-exchanger 4 facing the EV radiator 6 may have a small pitch among the fins and a small pitch among the tubes to lower the ability of heat conduction to suppress the rise of temperature of the cooling air guided to the EV radiator 6. When it is necessary to surround the peripheries of the first heat exchanger 4 and the integrated radiator 7 with a shroud (not shown) having the function of a duct to guide the cooling air to the first heat exchanger 4 and to the integrated radiator 7 in a concentrated manner preventing the diffusion of the cooling air, the portion of the first heat exchanger 4 facing the EV radiator 6 may be so constituted that the coolant does not flow thereto to suppress the rise of temperature of the cooling air that is guided to the EV radiator 6.

Described below next is a second embodiment. To carry out the control method described below based on various input signals from the water temperature sensor 95 and the like, the ECU controls an internal/external air change-over actuator such as a servo motor that drives the internal/external air change-over door 52 and the air conditioner inverter that controls the rotational speed of the compressor 31 relying upon a control program stored in the ROM or the like.

Figure 4:
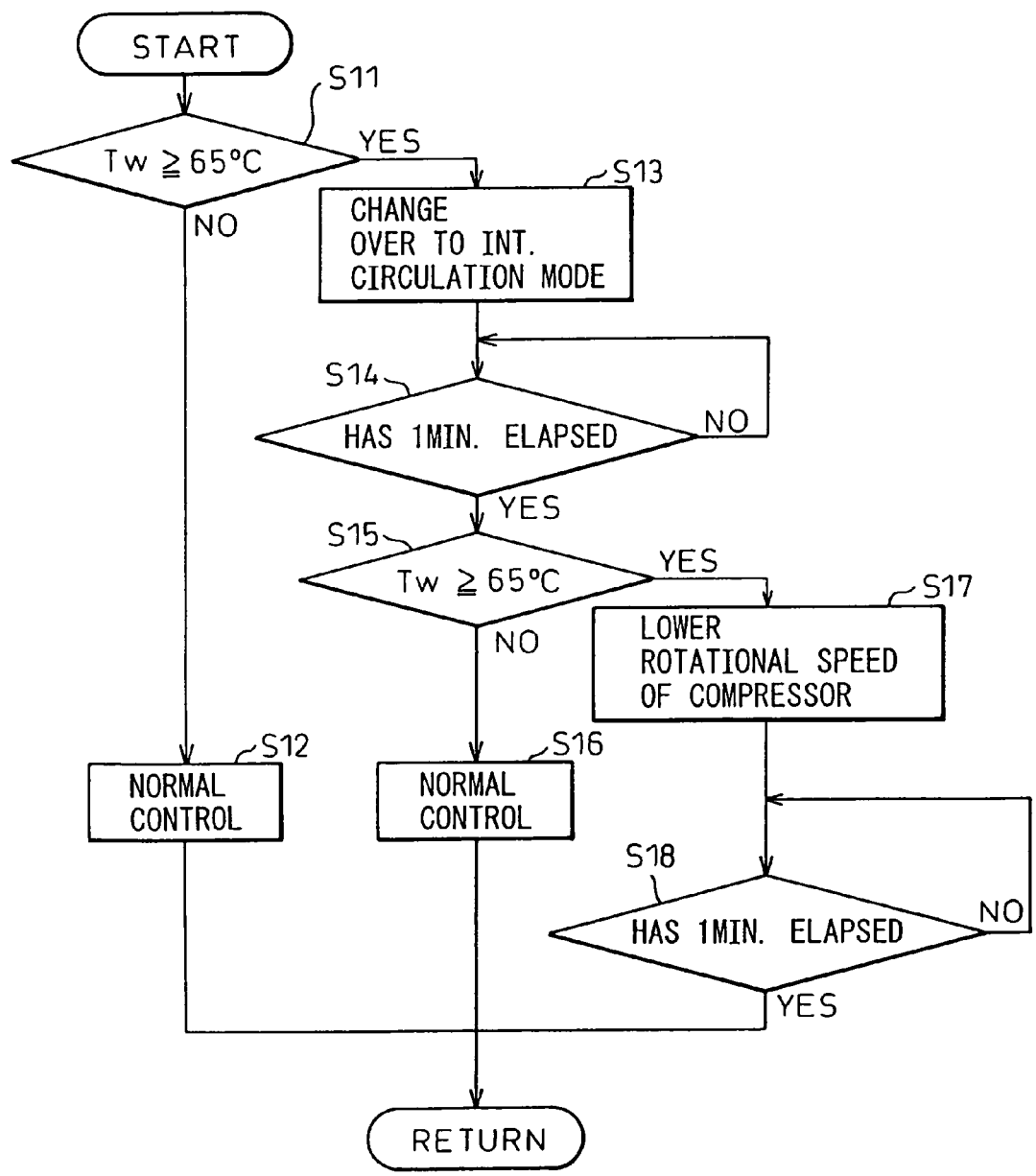
FIG. 4 is a flowchart illustrating a control method according to a second embodiment.

Next, described below is the control method according to the second embodiment. The control method of the second embodiment will be described by using a flowchart illustrated in FIG. 4. According to the control method of the second embodiment, when a value (Tw in FIG. 4) detected by the water temperature sensor 95 is higher than the setpoint value (65° C.)(step S11), the internal/external air change-over control means, first, works to change the internal/external air change-over door 52 over to the internal air circulation mode, so that the heat is absorbed in decreased amounts by the coolant from the conditioning air through the second heat exchanger 33 (step S13). After the standby for one minute (step S14), when the detected value is still higher than 65° C. (step S15), the second compressor control means works to lower the rotational speed of the compressor 31 by a predetermined amount (500 rpm) to thereby limit the blow-out amount of the compressor 31 and to decrease the amount of heat released from the coolant through the first heat exchanger 4 (step S17). After the standby for another one minute (step S18), the routine returns back to step S11. When the detected value is lower than 65° C. at step S11 or S15, the operation returns to the normal control operation (step S12 or S16), and the routine returns to step S11.

Next, the operation of the second embodiment will be described. In the air conditioning unit 5, the conditioning air introduced into the duct 51 by the blower 53 through the internal/external air change-over door 52 all passes through the second heat exchanger 33 and is cooled because the heat is robbed as the heat of vaporization of the coolant. The conditioning air after being cooled partly passes through the air-mixing door 55 and through the third heat exchanger 54, and is heated by the engine cooling water. The opening degree of the air-mixing door 55 is determined depending upon a target temperature of the conditioning air blown into the compartment 15. The conditioning air heated through the third heat exchanger 54 is mixed with the conditioning air that has by-passed the third heat exchanger 54, and is blown from various blow-out ports into the compartment through the face blow path 56, foot blow path 57 or defroster blow path 58.

In the refrigeration cycle 3, the gaseous coolant of a high temperature and a high pressure blown out from the compressor 31 is liquefied to become a liquid coolant in the first heat exchanger 4 as it gives the heat to the cooling air introduced by the air-cooling fan 35 through the front grill 12. The liquid coolant is injected through the coolant expansion valve 32 to expand like a mist, and flows into the second heat exchanger 33 where it is vaporized by robbing the conditioning air of heat. Thereafter, the coolant is compressed again by the compressor 31 to assume a high temperature and a high pressure to repeat the cycle.

In the engine cooling water circuit 8, the engine cooling water blown out by the engine cooling water pump 82 is sent to the travel use engine 81 to cool the travel use engine 81. Thereafter, the engine cooling water is sent to the third heat exchanger 54 to heat the conditioning air and is, then, sent to the engine radiator 84 where it is air-cooled by the cooling air that has passed through the first heat exchanger 4 and is blown out again by the engine cooling water pump 82.

In the EV cooling water circuit 9, the EV cooling water blown out from the EV cooling water pump 91 is sent to the electric parts 97 to cool them. Thereafter, the EV cooling water is air-cooled in the EV radiator 6 by the cooling air that has passed through the first heat exchanger 4, and is blown out again by the EV cooling water pump 91.

Here, the water temperature sensor 95 detects the temperature of the EV cooling water that flows out from the EV radiator 6. Based on the detected value, the above-mentioned air conditioner control means controls the refrigerating ability of the refrigeration cycle 3. This controls the amount of heat absorbed by the coolant from the conditioning air through the second heat exchanger 33 and the amount of heat released to the cooling air (atmosphere) from the coolant through the first heat exchanger 4.

Described below next is the effect of the second embodiment. As described above, the vehicle having the travel use motor mounts the refrigeration cycle 3 having the first heat exchanger 4 for air-cooling the coolant, the EV radiator 6 arranged downstream of the first heat exchanger 4 in series in a direction in which the cooling air flows to air-cool the EV cooling water that cools the electric parts 97 mounted on the vehicle, the water temperature sensor 95 for detecting the temperature of the EV cooling water that flows out from the EV radiator 6, and air conditioning control means which lowers the refrigerating ability of the refrigeration cycle 3 when the temperature of the EV cooling water detected by the water temperature sensor 95 is higher than the setpoint value (65° C.).

Therefore, when the temperature of the EV cooling water detected by the water temperature sensor 95 is higher than the setpoint value, heat is absorbed in decreased amounts from the conditioning air and is released in decreased amounts to the cooling air (atmosphere) through the refrigeration cycle 3. It is therefore allowed to lower the temperature of the cooling air that cools the EV cooling water and hence to maintain the EV cooling water to be lower than 65° C.

Figure 5:
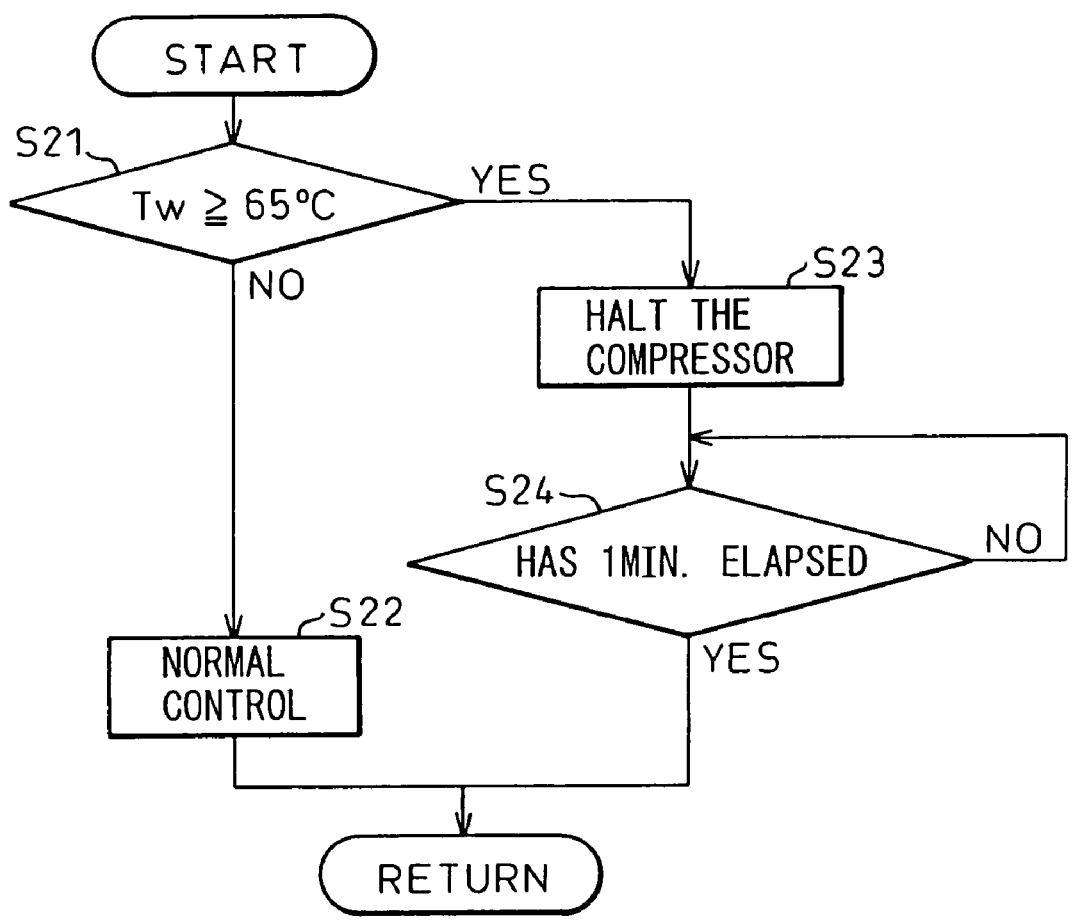
FIG. 5 is a flowchart illustrating the control method according to a third embodiment.

Next, the control method according to a third embodiment will be described. A flowchart of FIG. 5 illustrates the control method of the third embodiment. In the control method of the third embodiment, a third compressor control means works to halt the compressor 31 when a value (Tw in FIG. 5) detected by the water temperature sensor 95 is higher than the setpoint value (65° C.)(step S21), whereby the compressor 31 ceases to blow out the coolant, and no heat is released from the coolant through the first heat exchanger 4 (step S23). After the standby for one minute (step S24), the routine returns back to step S21. When the value detected at step S21 is lower than 65° C., the normal control operation is resumed (step S22), and the routine returns to step S21.

Next, described below is the effect of the third embodiment. When the temperature of the EV cooling water detected by the water temperature sensor 95 is higher than the setpoint value (65° C.) as described above, heat is absorbed from the conditioning air through the refrigeration cycle 3 and no heat is released to the cooling air (atmosphere), making it possible to lower the temperature of the cooling air that cools the EV cooling water and to maintain the EV cooling water to be lower than 65° C.

Figure 6:
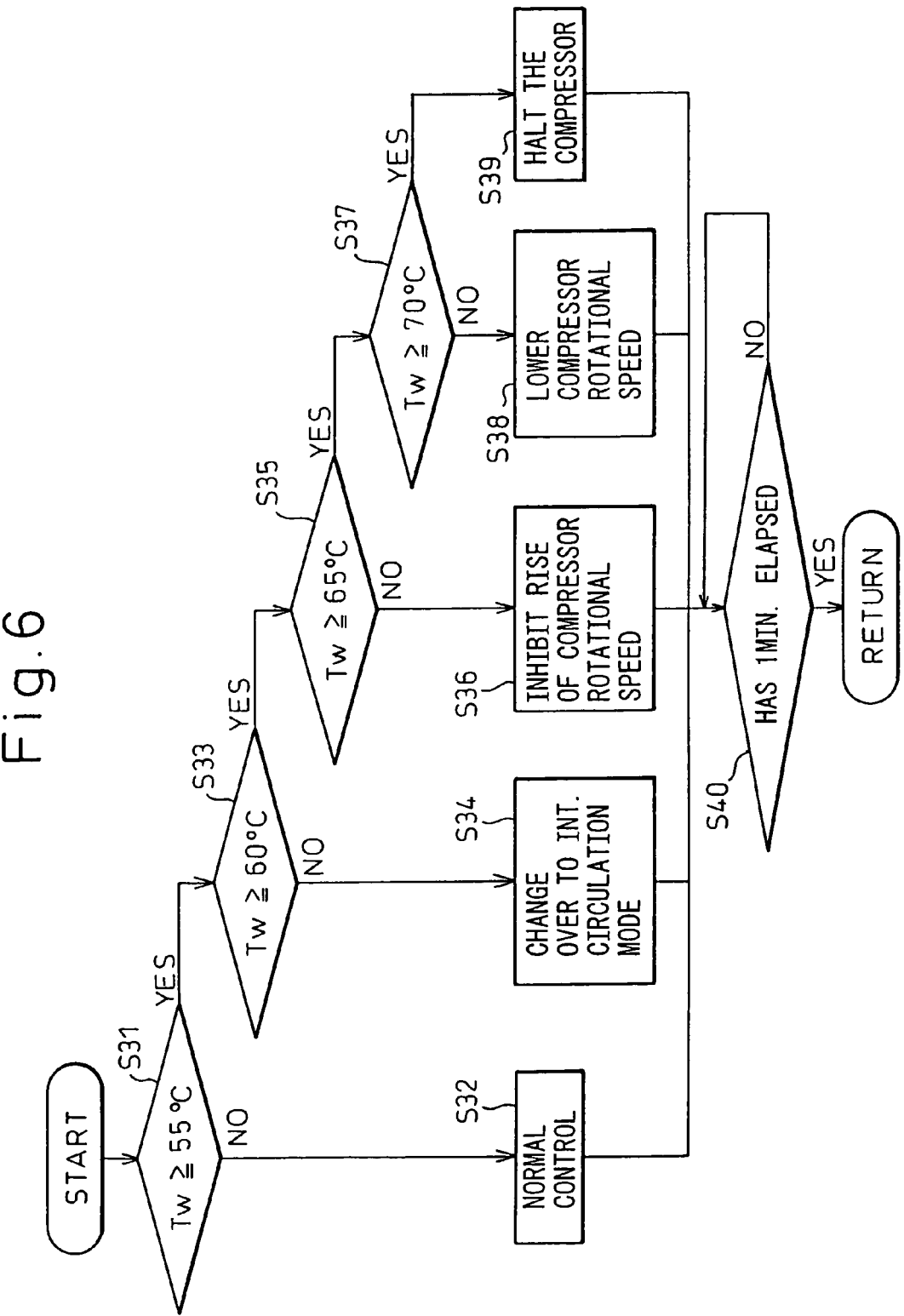
FIG. 6 is a flowchart illustrating the control method according to a fourth embodiment.

Next, the control method according to a fourth embodiment will be described. A flowchart of FIG. 6 illustrates the control method of the fourth embodiment. In the control method of the fourth embodiment, it is judged in which one of the zones A to E shown in FIG. 7, the value (Tw in FIG. 6) detected at step S31, S33, S35 or S37 lies. Here, the zones A to E have degrees of emergency, that decrease in order of E, D, C, B and A, that need a greater decrease in the refrigerating ability.

First, when the detected value is in the zone A (lower than 55° C.)(NO at step S31), the normal control operation is conducted (step S32). When the detected value is in the zone B (higher than 55° C. but lower than 60° C.)(NO at step S33), the internal/external air change-over control means is executed (step S34). When the detected value is in the zone C (higher than 60° C. but lower than 65° C.)(NO at step S35), the first compressor control means inhibits the rise of the rotational speed of the compressor 31, whereby the blow-out amount of the compressor 31 is limited to release the heat in decreased amounts from the coolant through the first heat exchanger 4 (step S36). When the detected value is in the zone D (higher than 65° C. but lower than 70° C.)(NO at step S37), the above second compressor control means is executed (step S38). When the detected value is in the zone E (higher than 70° C.)(YES at step S37), the above third compressor control means is executed (step S39).

After means of steps S32, S34, S36, S38 and S39 are executed, the routine returns to step S31 through the standby of one minute (step S40).

Next, described below is the effect of the fourth embodiment. If there are set stepwise a plurality of setpoint values for the temperatures of the EV cooling water detected by the water temperature sensor 95, the amount of the coolant blown into the first heat exchanger 4 or the amount of heat absorbed by the coolant in the second heat exchanger 33 decreases stepwise, and the amount of heat released to the cooling air from the coolant through the first heat exchanger 4 can be decreased stepwise. It is therefore allowed to lower stepwise the temperature of the cooling air that cools the EV cooling water and to execute the control operation depending upon the degree of emergency.

Described below is a further embodiment. In this embodiment, the invention is applied to the hybrid car 1 having the travel use motor and the travel use engine 81. The invention, however, may be applied to a railway vehicle or an electric car that travels using the travel use motor only.

In this embodiment, the first heat exchanger 4 is disposed being faced to the whole front surface of the integrated radiator 7. However, the first heat exchanger 4 may not be faced to the front surface of the EV radiator 6, and the EV cooling water may be cooled with the cooling air that is not receiving heat released from the coolant through the first heat exchanger 4. Further, a portion of the first heat-exchanger 4 facing the EV radiator 6 may have a small pitch among the fins and a small pitch among the tubes to lower the ability of heat conduction and to suppress the rise of temperature of the cooling air guided to the EV radiator 6. When it is necessary to surround the peripheries of the first heat exchanger 4 and the integrated radiator 7 by a shroud (not shown) having a function of duct to guide the cooling air to the first heat exchanger 4 and to the integrated radiator 7 in a concentrated manner preventing the diffusion of the cooling air, the portion of the first heat exchanger 4 facing the EV radiator 6 may be so constituted that the coolant does not flow thereto to suppress the rise of temperature of the cooling air that is guided to the EV radiator 6. Instead of employing the integrated radiator 7, further, the EV radiator 6 only may face the first heat exchanger 4.

The embodiments have dealt with air conditioning control means that executes the third compressor control means only, air conditioning control means that executes the internal/external air change-over control means and the second compressor control means, successively, and air conditioning control means that executes the internal/external air change-over control means, the first compressor control means, the second compressor control means and the third compressor control means, successively. It is further allowable to employ the air conditioning control means based on any one of means or based on a combination of two or more means among the internal/external air change-over control means, the first compressor control means, the second compressor control means and the third compressor control means.

In the internal/external air change-over control means, in the first compressor control means, in the second compressor control means and in the third compressor control means of the embodiment, the control operation is changed over to the normal control operation when the value detected by the water temperature sensor 94 is lower than the setpoint value after the passage of one minute. It is, however, also allowable to employ a hysteresis system in which the detected value must be smaller than a further lower setpoint value. When the hysteresis system is employed, there is no need of standby of one minute after each means.

While the invention has been described by reference to specific embodiments chosen for purpose of illustration, it should be apparent that numerous modifications could be made thereto by those skilled in the art without departing from the basic concept and scope of the invention.

What is claimed is:

1. An air conditioning device for a vehicle comprising:
    a refrigeration cycle having a compressor for compressing and blowing out a coolant, a first heat exchanger for air-cooling the coolant blown out from the compressor, that are mounted on a vehicle having a travel use motor;
    an air conditioner inverter for controlling the rotational speed of the compressor by feeding electric power to said compressor;
    electric parts related to the travel use motor and for producing electric power in relation to the travel use motor;
    a radiator arranged downstream of the first heat exchanger in series in a direction in which the cooling air flows for air-cooling the cooling water that cools said air conditioner inverter and said electric parts related to the travel use motor;
    cooling water temperature detector means for detecting the temperature of said cooling water that flows out from said radiator; and
    air conditioner inverter protection means for lowering the output of said air conditioner inverter when the temperature of the cooling water detected by said cooling water temperature detector means exceeds a preset protection temperature; wherein
    the second heat exchanger arranged in a duct that introduces the air into the compartment to cool the air by the coolant, wherein said air conditioning control means decreases the amount of heat absorbed by the coolant through said second heat exchanger when the temperature of the cooling water detected by said cooling water temperature detector means is higher than a setpoint value; and
    the air conditioning device further comprises an internal/external air change-over door that changes over to either an external air introduction mode for introducing the air into said duct from outside the compartment or an internal circulation mode for circulating the air in the compartment, wherein said air conditioning control means is internal/external air change-over control means for changing said internal/external air change-over door over to the internal air circulation mode when the temperature of the cooling water detected by said cooling water temperature detector means is higher than the setpoint value.

2. An air conditioning device for a vehicle according to claim 1, wherein said electric parts related to the travel use motor include a travel use motor inverter that controls the rotational speed of said travel use motor by feeding electric power to said travel use motor.

3. An air conditioning device for a vehicle according to claim 1, wherein said electric parts related to the travel use motor includes a DCDC converter that lowers the DC power of a main battery mounted on said vehicle and feeds the lowered power to an auxiliary battery.

4. An air conditioning device for a vehicle according to claim 1, wherein said air conditioning control means also lowers the amount of heat released from the coolant through said first heat exchanger when the temperature of the cooling water detected by said cooling water temperature detector means is higher than the setpoint value.

5. An air conditioning device for a vehicle according to claim 4, further comprising a compressor for compressing and blowing the coolant into said first heat exchanger, wherein said air conditioning control means is also compressor control means for controlling the blowing amount of said compressor when the temperature of the cooling water detected by said cooling water temperature detector means is higher than the setpoint value.

6. An air conditioning device for a vehicle according to claim 5, wherein, when the temperature of the cooling water detected by said cooling water temperature detecting means is higher than the setpoint value, said compressor control means comprises a combination of one or two or more of first compressor control means for inhibiting the rise of rotational speed of said compressor, second compressor control means for lowering the rotational speed of said compressor by a predetermined amount, and third compressor control means for halting said compressor.

7. An air conditioning device for a vehicle comprising:
    a refrigeration cycle having a compressor for compressing and blowing out a coolant, a first heat exchanger for air-cooling the coolant blown out from the compressor, that are mounted on a vehicle having a travel use motor;
    an air conditioner inverter for controlling the rotational speed of the compressor by feeding electric power to said compressor;
    electric parts related to the travel use motor and for producing electric power in relation to the travel use motor;
    a radiator arranged downstream of the first heat exchanger in series in a direction in which the cooling air flows for air-cooling the cooling water that cools said air conditioner inverter and said electric parts related to the travel use motor;

cooling water temperature detector means for detecting the temperature of said cooling water that flows out from said radiator; and air conditioner inverter protection means for lowering the output of said air conditioner inverter when the temperature of the cooling water detected by said cooling water temperature detector means exceeds a preset protection temperature; wherein the second heat exchanger is arranged in a duct that introduces the air into the compartment to cool the air by the coolant, the air conditioning device further comprises an internal/external air change-over door that changes over to either an external air introduction mode for introducing the air into said duct from outside the compartment or an internal circulation mode for circulating the air in the compartment, the compressor compressing and blowing the coolant into said first heat exchanger, wherein, when the temperature of the cooling water detected by said cooling water temperature detecting means is higher than a setpoint value, said conditioning air control means comprises internal/external air change-over control means for changing said internal/external air change-over door over to the internal air circulation mode, and any combination of two or more of first compressor control means for inhibiting the rise of rotational speed of said compressor, second compressor control means for lowering the rotational speed of said compressor by a predetermined amount, and third compressor control means for halting said compressor.

8. An air conditioning device for a vehicle according to claim 7, wherein said electric parts related to the travel use motor include a travel use motor inverter that controls the rotational speed of said travel use motor by feeding electric power to said travel use motor.

9. An air conditioning device for a vehicle according to claim 7, wherein said electric parts related to the travel use motor includes a DCDC converter that lowers the DC power of a main battery mounted on said vehicle and feeds the lowered power to an auxiliary battery.

10. An air conditioning device for a vehicle according to claim 7, wherein said air conditioning control means also decreases the amount of heat absorbed by the coolant through said second heat exchanger when the temperature of the cooling water detected by said cooling water temperature detector means is higher than a setpoint value.

11. An air conditioning device for a vehicle according to claim 7, wherein said air conditioning control means is also internal/external air change-over control means for changing said internal/external air change-over door over to the internal air circulation mode when the temperature of the cooling water detected by said cooling water temperature detector means is higher than the setpoint value.

12. An air conditioning device for a vehicle according to claim 7, wherein said air conditioning control means also lowers the amount of heat released from the coolant through said first heat exchanger when the temperature of the cooling water detected by said cooling water temperature detector means is higher than the setpoint value.

13. An air conditioning device for a vehicle according to claim 7, further comprising a compressor for compressing and blowing the coolant into said first heat exchanger, wherein said air conditioning control means is also compressor control means for controlling the blowing amount of said compressor when the temperature of the cooling water detected by said cooling water temperature detector means is higher than the setpoint value.

14. An air conditioning device for a vehicle according to claim 7, wherein, when the temperature of the cooling water detected by said cooling water temperature detecting means is higher than the setpoint value, said compressor control means comprises a combination of one or two or more of first compressor control means for inhibiting the rise of rotational speed of said compressor, second compressor control means for lowering the rotational speed of said compressor by a predetermined amount, and third compressor control means for halting said compressor.

* * * * *